United States Patent [19]

Kan et al.

[11] Patent Number: 4,838,940

[45] Date of Patent: Jun. 13, 1989

[54] IMAGE RECORDING INK

[75] Inventors: Fumitaka Kan, Tokyo; Kohzoh Arahara; Noboru Tohyama, both of Kawasaki; Toshiya Yuasa, Mitaka; Hiroshi Fukumoto, Kawasaki, all of Japan

[73] Assignee: Canon Kabushiki Kaisha, Tokyo, Japan

[21] Appl. No.: 156,978

[22] Filed: Feb. 18, 1988

[30] Foreign Application Priority Data

| | | | |
|---|---|---|---|
| Feb. 21, 1987 | [JP] | Japan | 62-36904 |
| Jan. 25, 1988 | [JP] | Japan | 63-15241 |
| Jan. 25, 1988 | [JP] | Japan | 63-15242 |

[51] Int. Cl.⁴ .......... C09D 11/00

[52] U.S. Cl. .......... 106/22; 106/20

[58] Field of Search .......... 106/20, 22

[56] References Cited

U.S. PATENT DOCUMENTS

| | | | |
|---|---|---|---|
| 4,508,570 | 4/1985 | Fujii et al. | 106/20 |
| 4,661,158 | 4/1987 | Kobayashi et al. | 106/22 |
| 4,713,113 | 12/1987 | Shimada et al. | 106/22 |
| 4,737,190 | 4/1988 | Shimada et al. | 106/22 |

*Primary Examiner*—Prince E. Willis

*Assistant Examiner*—Willie J. Thompson

*Attorney, Agent, or Firm*—Fitzpatrick, Cella, Harper & Scinto

[57] ABSTRACT

An ink which can be imparted with an adhesiveness on application of an electric current is obtained by impregnating a crosslinked substance such as guar gum or polyvinyl alcohol compound with a liquid dispersion medium such as water. The ink is supplied with a pattern of energy to be provided with an adhesive pattern, which is then transferred to a recording medium, such as plain paper, directly or by the medium of an intermediate transfer medium to form an ink pattern corresponding to the energy pattern applied. The ink further comprises a buffer action-imparting substance and is excellent in storage stability and stability of performances during a continuous use.

15 Claims, 6 Drawing Sheets

IMAGE RECORDING INK

FIELD OF THE INVENTION AND RELATED ART

The present invention relates to an ink adapted to an image recording method which retains various advantages of the conventional recording systems and yet realizes a low recording cost.

In recent years, along with the rapid progress of information industries, various data processing systems have been developed, and accordingly various recording methods and recording apparatus have been developed and adopted for the respective data processing systems. Among these, representative recording systems capable of recording on plain paper include electrophotography and laser beam printing system developed therefrom, ink jetting, thermal transfer, and impact printing system using a wire dot printer or daisywheel printer.

The impact printing system produces annoying noise and the application thereof to full- or multicolor recording is difficult. The electrophotography and the laser beam printing produce images at a high resolution, but the apparatus therefor are complicated and large in size thus requiring a large apparatus cost. The ink jet printing system requires only a small expendable cost but involves a process defect that, because a thin nozzle is used for jetting a low-viscosity liquid ink therefrom, the nozzle is liable to be clogged with the ink solidified during a period of non-use. Further, as the ink for the ink jet system is low-viscosity ink, the ink is liable to spread after it is deposited on paper, thus resulting in blurring of images.

Further, according to the thermal transfer method, wherein a heat pattern was supplied to a solid ink layer formed on a sheet form support to form a fused ink pattern, which is then transferred to plain paper, etc., to form an image thereon. The thermal transfer method has advantages that a relatively small apparatus is used and therefore only a small apparatus cost is required. However, an ink ribbon used in the thermal transfer method is composed by forming a solid ink layer on an expensive support and the ink ribbon is disposed after use, so that the thermal transfer method involves a disadvantage that it requires a high expendable cost.

In order to remove the above disadvantage of the thermal transfer method, our research group has proposed a novel recording method which has solved the above-mentioned problems and realized a low recording cost (Japanese Patent Application No. 175191/1986, corresponding to U.S. patent application Ser. No. 075,045).

This recording method comprising:

providing a fluid ink which is capable of forming a fluid layer substantially non-adhesive and capable of being imparted with an adhesiveness on application of an energy, forming a layer of the fluid ink on an ink-carrying member, applying a pattern of the energy corresponding to a given image signal to the ink layer to form an adhesive pattern of the ink, and transferring the adhesive pattern of the ink to a transfer-receiving medium to form thereon an ink pattern corresponding to the energy pattern applied.

This novel recording method has realized a low recording cost but there has bee room for improvement in view of long-term storage stability and stability of performances during a continuous use.

SUMMARY OF THE INVENTION

An object of the present invention is to provide an ink suitably used in an image recording method which has solved the above-mentioned problems of the conventional recording systems.

Another object of the present invention is to provide a type of ink which can be used up without disposal as far as it has not been actually used for recording or without using an ink ribbon or ink sheet to be disposed after use as in the conventional thermal transfer system.

A further object of the present invention is to provide an ink which is not attached or transferred to an intermediate transfer medium or a recording medium (final transfer medium) when it only contacts such a medium and which can be used without being applied as a thin solid ink layer on a support unlike a solid ink held on a conventional ink ribbon or ink donor film.

A still further object of the present invention is to provide an ink excellent in storage stability and stability of performances during a continuous use.

As a result of our study on improvement in an ink which is suitably used for the above-mentioned novel recording method, we have found that the storage stability and the stability of performances during a continuous use can be considerably enhanced, substantially without impairing the selective control of the adhesiveness of the ink, by imparting a buffer action to the ink.

The image recording ink of the present invention is based on the above findings and comprises: a liquid dispersion medium, and a crosslinked substance impregnated with the liquid dispersion medium; the ink being capable of being imparted with an adhesiveness on application of an electric current; the ink containing a substance capable of imparting a pH buffer action thereto. The buffer action-imparting substance comprises an electrolyte, an ionic surfactant, or a solid acid comprising a metal oxide.

By using the above-described image recording ink of the present invention, the ink may be directly formed into a layer, and a part of the ink may be directly and selectively (or patternwise) provided with an adhesiveness to be transferred onto a transfer-receiving medium, thus forming an ink pattern thereon.

Therefore, according to the present invention, an expensive ink ribbon or ink sheet which comprises a solid ink layer formed through complicated steps on an expensive support sheet and yet is to be disposed in the conventional thermal transfer process becomes unnecessary, whereby the expendable cost can be reduced remarkably.

Further, in the present invention, a part of the ink not actually used in the recording operation can be easily recycled for repeated use, so that the recording cost can be decreased also from this point.

These and other objects, features and advantages of the present invention will become more apparent upon a consideration of the following description of the preferred embodiments of the present invention taken in conjunction with the accompanying drawings, wherein like reference numerals denote like parts. In the following description, "%" and "part(s)" representing a quantitative proportion or ratio are by weight unless otherwise noted specifically.

DETAILED DESCRIPTION OF THE INVENTION

Figure 1:
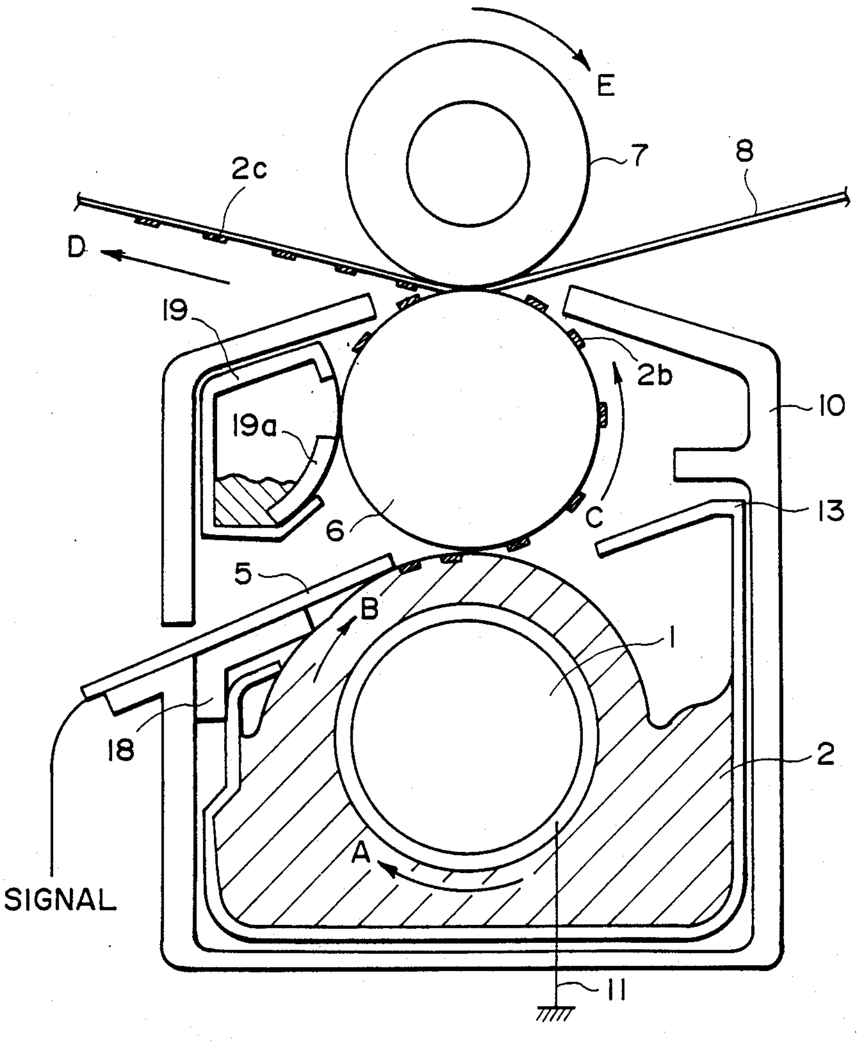
FIGS. 1 and 2 are respectively a schematic sectional view of an apparatus for practicing a recording method using the image recording ink of the present invention.

The image recording ink according to the present invention may preferably be one which is substantially non-adhesive and capable of being imparted with an adhesiveness on application of an electric current.

More specifically, the ink of the present invention may preferably have the following non-adhesiveness (or liquid dispersion medium-retaining ability).

On the surface of a sample ink held in a container, an aluminum foil of 5 cm×5 cm in size is, after being accurately weighed, placed gently and is left standing as it is for 1 min. in an environment of a temperature of 25° C. and a moisture of 60%. Then, the aluminum foil is gently peeled off from the surface of the ink and then quickly weighed accurately to measure the increase in weight of the aluminum foil. Through the measurement, the ink of the present invention should preferably show substantially no transfer of its solid content and a weight increase of the aluminum foil of less than 1000 mg, particularly on the order of 0–100 mg. In the above measurement, it is possible to separate the aluminum foil from the ink body, if necessary, with the aid of a spatula.

If the non-adhesiveness of the ink is insufficient in the light of the above standard, the ink per se can transfer to a transfer-receiving medium to a practically non-negligible extent even under no current application, thus resulting in a lower image quality.

As described above, the ink according to a preferred embodiment of the present invention has a layer-forming property but is substantially non-adhesive and can be imparted with an adhesiveness on application of an electric energy.

The term "adhesiveness" used herein is a selective one and refers to a property of the ink by which a portion of the ink contacting an object such as an intermediate transfer medium (e.g., Reference Numeral 6 in FIG. 1, described hereinafter) is selectively separated or cut from the ink body to adhere to the object. Thus, the "adhesiveness" is not concerned with whether the ink body is glutinous or not.

Accordingly, in an ink layer formed on an ink-carrying roller (Reference Numeral 1 in FIG. 1, described hereinafter), in a state where no energy is applied thereto, substantially no ink is transferred to another medium such as the intermediate transfer medium, even when the ink contacts the medium.

Further, it is preferred that the ink of the present invention has a plasticity when it is applied onto an ink-carrying roller but the ink has an elasticity during a stage after an energy application step up to a transfer step of contacting the intermediate transfer roller. Therefore, the ink used in an embodiment as shown in FIG. 1 may preferably have a certain viscoelasticity (i.e., complex elasticity comprising an elasticity term and a viscosity term).

More specifically, in the ink of the present invention, it is preferred that a ratio (G''/G') of a loss elasticity modulus G'' to a storage elasticity modulus G' as described below is about 0.1–10.

The above-mentioned storage elasticity modulus (G') and loss elasticity modulus (G'') may be determined in the following manner.

Figure 5A:
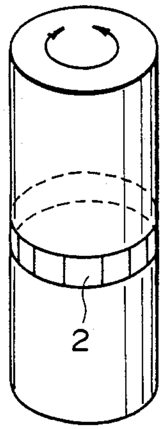
FIG. 5A and 5B are explanatory views for illustrating a method of measuring the viscoelasticity of the ink.
Figure 5B:
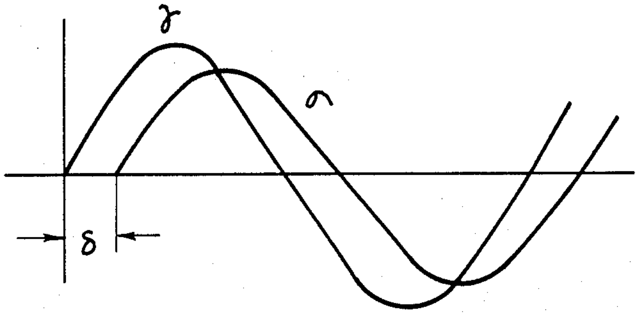

Referring to a schematic perspective view of FIG. 5A, the ink 2 of the present invention is formed into a sample having a diameter of 25 mm and a thickness of 2 mm. A sine strain $\gamma$ with an angular velocity of 1 rad/sec is applied to the sample in the direction (shear direction) as shown by an arrow in FIG. 5A, and a stress $\sigma$ and a phase delay $\delta$ are detected as shown in FIG. 5B. As a result, a complex elasticity modulus G*, a storage elasticity modulus G' and a loss elasticity modulus G'' are determined by the following formula:

$$G^* = \sigma/\gamma = G' + iG'',$$

$$G''/G' = \tan \delta$$

wherein G' denotes a storage elasticity modulus and G'' denotes a loss elasticity modulus.

In the above complex elasticity modulus, if the ratio (G''/G') is less than 0.1, the ink insufficiently behaves as a plastic material whereby the ink is insufficiently applied onto an ink-carrying roller. On the other hand, if the ratio (G''/G') is more than 10, the ink insufficiently behaves as an elastic material whereby the ink insufficiently causes an elastic restoration during a stage after an energy application step up to a transfer step of contacting an intermediate transfer medium. Incidentally, the size of the above-mentioned ink sample and the method of applying the strain thereto have been appropriately selected in consideration of a recording apparatus using the ink of the present invention.

A preferred embodiment of the ink having such layer-forming property and non-adhesiveness include an ink in the form of a gel, in a broad sense, comprising a cross-linked substance impregnated with and holding therewith a liquid dispersion medium. Particles having a particle size of preferably 0.01–100 μm, further preferably 0.01–20 μm may by further dispersed in the above gel ink.

With respect to the gel ink, it is presumed that the gel ink is substantially non-adhesive or not substantially transferred to a transfer-receiving medium because the liquid dispersion medium except for a minor portion thereof is well retained in the crosslinked substance.

It is also presumed that when the gel ink is supplied with a pattern of an energy, such as that due to electric conduction, the crosslinked structure, the ionic structure or the alignment state of the particles is changed thereby, so that the ink is imparted with an adhesiveness in a pattern corresponding to the energy pattern.

Herein, the "crosslinked substance" refers to a single substance which per se can assume a crosslinked structure, such as those generally known as a thickness or a gelling agent, or a mixture of a substance capable of assuming a crosslinked structure with the aid of an additive such as a crosslinking agent for providing a crosslinking ion such as borate ion, and the additive. Further, the term "crosslinked structure" refers to a three-dimensional structure having a crosslinkage or crosslinking bond. The crosslinkage may be composed of any one or more of covalent bond, ionic bond, hydrogen bond and van der Waal's bond.

In the ink of the present invention, the crosslinked structure is only required to be such that a desired degree of liquid dispersion medium-retaining property is given thereby. More specifically, the crosslinked structure may be any one of a network, a honeycomb, a helix, etc., or may be an irregular one.

The liquid dispersion medium (or vehicle) in the ink of the present invention may be any inorganic or organic liquid medium which is preferably liquid at room temperature. The liquid medium should preferably have a relatively low volatility, e.g., one equal to or even lower than that of water.

A preferred example of the liquid dispersion medium is an aqueous or a hydrophilic dispersion medium inclusive of water, a water-miscible solvent, and a mixture of water and a water-miscible solvent.

In case where such an aqueous or hydrophilic dispersion medium is used as the liquid dispersion medium, the crosslinked substance may preferably be composed of or from a natural or synthetic hydrophilic high polymer or macromolecular substance.

Examples of such a hydrophilic high polymer include: plant polymers, such as guar gum, locust bean gum, gum arabic, tragacanth, carrageenan, pectin, mannan, and starch; microorganism polymers, such as xanthane gum, dextrin, succinoglucan, and curdran; animal polymers, such as gelatin, casein, albumin, and collagen, cellulose polymers such as methyl cellulose, ethyl cellulose, and hydroxyethyl cellulose; starch polymers, such as soluble starch, carboxymethyl starch, methyl starch; alginic acid polymers, such as propylene glycol alginate, and alginic acid salts; other semi-synthetic polymers, such as derivatives of polysaccharides; vinyl polymers, such as polyvinyl alcohol, polyvinylpyrrolidone, polyvinyl methyl ether, carboxyvinyl polymer, and sodium polyacrylate; and other synthetic polymers, such as polyethylene glycol, and ethylene oxide-propylene oxide block copolymer. These polymers may be used singly or in mixture of two or more species , as desired.

The hydrophilic polymer may preferably be used in a proportion of 0.2-50 parts, particularly 0.5-30 parts, with respect to 100 parts of the liquid dispersion medium.

On the other hand, when oil such as mineral oil or an organic solvent such as toluene is used as the liquid dispersion medium, the crosslinked substance may be composed of or from one or a mixture of two or more compounds selected from metallic soaps inclusive of metal stearates, such as aluminum stearate, magnesium stearate, and zinc stearate, and similar metal salts of other fatty acids, such as palmitic acid, myristic acid, and lauric acid; or organic substances such as hydroxypropyl cellulose derivative, dibenzylidene-D-sorbitol, sucrose fatty acid esters, and dextrin fatty acid esters. These substances may be used in an amount similar to that of the abovementioned hydrophilic polymer.

When the hydrophilic polymer or metallic soap, etc., is used, the fluidity and liquid dispersion medium -retaining ability of the result ink vary to some extent depending on the formulation of these components or combination thereof with a liquid dispersant medium. It is somewhat difficult to determine the formulation or composition of these components in a single way. Accordingly, it is preferred to formulate a composition of a liquid dispersion medium and a crosslinked substance so that the resultant ink will satisfy the layer-forming property and non-adhesiveness (liquid dispersion medium-retaining property) as defined above.

In addition to the above-mentioned liquid dispersion medium and crosslinked substance, the image recording ink of the present invention further comprises a substance capable of imparting a pH buffer action to the ink. The storage stability and stability of performances during a continuous use is considerably enhanced by adding the buffer action-imparting substance to the ink.

More specifically, the ink according to the present invention may preferably exhibit the following pH stability and/or viscosity stability.

(1) pH stability 100 g of the ink of the present invention, of which initial pH is p, is charged into a beaker. Incidentally, the initial pH (=p) is the pH value of the ink before use (e.g., p=8.3 in Example 1 described hereinafter). To the ink, 1 ml of a 0.1N-aqueous sodium hydroxide solution (or 1 ml of a 0.1N-hydrochloric acid) is added and uniformly stirred, whereby the pH becomes a. In this case, in the ink of the present invention, there may preferably be satisfied a relationship, $$-0.3 \leqq (a-p) \leqq +0.3,$$

more preferably, $$-0.1 \leqq (a-p) \leqq +0.1.$$

(2) Viscosity Stability 100 g of the ink of the present invention, in which the initial pH is p and the initial viscosity is A (cps), is charged into a beaker. Incidentally, the initial pH (=p) is the pH value of the ink before use (e.g., p=8.3 in Example 1 described hereinafter). To the ink, 1 ml of a 0.1N-aqueous sodium hydroxide solution (or 1 ml of a 0.1N-hydrochloric acid) is added and uniformly stirred, whereby the viscosity becomes B (cps). In this case, in the ink of the present invention, there may preferably be satisfied a relationship, $$-0.5 \leqq (B-A)/A \leqq +1,$$

more preferably, $$-0.3 \leqq (B-A)/A \leqq +0.3.$$

The viscosity A and viscosity B used herein are those measured by means of a rotational viscometer, (vismetron Model VS-A 1, mfd. by Shibaura System K.K.) with a stainless steel (SUS 27) rotor of about 3 mm in diameter at rotor speed of 0.6 rpm, at normal temperature (25° C.).

When the ink of the present invention is supplied with electric conduction, because of a pH change caused thereby, the ink is at least partially subjected to a change in or destruction of the crosslinked structure to be reversibly converted into a sol state, whereby it is selectively imparted with an adhesiveness corresponding to the energy application pattern.

According to our knowledge, e.g., when a polyvinyl alcohol crosslinked with borate ions is used as the crosslinked substance, the change in the crosslinked structure caused by a pH change due to electric conduction may be considered as follows.

Thus, when the borate ion bonded to the —OH groups of the polyvinyl alcohol,

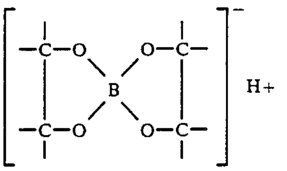

is subjected to an anodic reaction in the neighborhood of an anode based on electric conduction (or to the addition of an electron acceptor such as hydrochloric acid), the pH of the ink is changed to the acidic side and electrons may be removed from the above-mentioned borate ion to destroy at least a part of the crosslinked structure, whereby the ink may be imparted with an adhesiveness selectively or imagewise. The reaction at this time may presumably be expressed by the following formula:

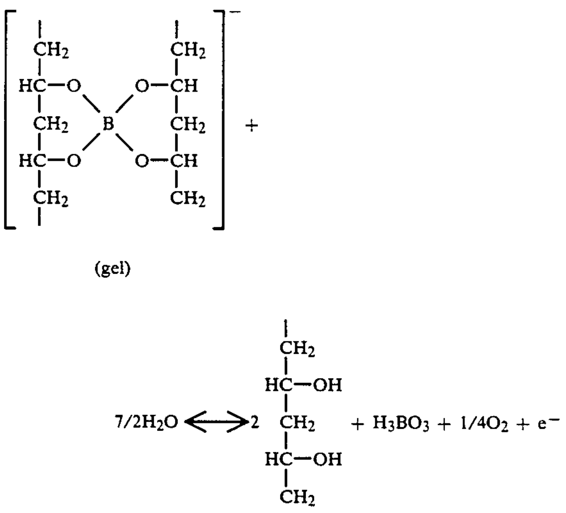

(gel)

(sol)

With respect to the above-mentioned solgel transition, the gelation is generally promoted by an increase in pH and the solation is generally promoted by a decrease in pH, while depending on the polymerization degree or saponification degree of the polyvinyl alcohol, or the amount of borate ions used.

Further, with respect to the electrochemical reaction based on the electric conduction, water is electrolyzed in the following manner.

anode side: $2OH^- \rightarrow H_2O + \frac{1}{2}O_2\uparrow + 2e^-$ cathode side: $2H^+ + 2e^- \rightarrow \frac{1}{2}H_2\uparrow$ In connection with this reaction, the equilibrium in the hydrogen ion (concentration) is disturbed whereby the ink becomes acidic on the anode side and becomes alkaline on the cathode side. As a result, the ink solates on the anode side to effect a recording based on the adhesiveness while it gelates on the cathode side. Therefore, when the ink which has changed from the gel state to the sol state (i.e., the acidic state) in the anode side is transferred to a transfer-receiving medium, the acidified ink decreases in view of the entire ink.

On the other hand, the ink is alkalified and gelates on the cathode side thereby to be hardened. Further, because this hardened ink is not transferred, the pH value of the entire ink increases and the hardening thereof is promoted. As a result, the layer-forming property of the ink can be impaired and therefore the recording can be difficult to be conducted.

However, because the image recording ink according to the present invention contains the abovementioned buffer action-imparting substance, in view of the entire ink, the pH-change based on the above electrochemical reaction is suppressed and pH conditions suitable for recording may be retained even when the recording based on the electric conduction is continuously effected.

Hereinbelow, the buffer action-imparting substance, i.e., a substance capable of imparting a buffer action to the ink, will be described in detail.

First, an electrolyte may be used as the buffer action-imparting substance. More specifically, there may preferably used at least one of a weak acid, a weak acid salt, a weak base, and a weak acid salt. More preferably, there may be used a combination of a weak acid and a weak acid salt, or a combination of a weak base and a weak base salt.

Generally, the buffer action-imparting electrolyte may preferably be used in an amount of about 0.5-20 parts, per 100 parts of the liquid dispersion medium, while depending on the kind or buffer capacity of the electrolyte.

Specific examples of such electrolyte may include: salts such as potassium hydrogenphthalate ($C_8H_5KO_4$), potassium dihydrogen phosphate ($KH_2PO_4$), sodium hydrogencarbonate ($NaHCO_3$) and disodium hydrogenphosphate ($Na_2HPO_4$); phosphoric acid ($H_3PO_4$), aqueous ammonia ($NH_4OH$), etc. These electrolytes may be used singly or in a combination of two or more species, as desired.

In order to adjust the pH of a buffer solution containing such electrolyte, a strong acid or base such as hydrochloric acid (HCl) and sodium hydroxide (NaOH); or a salt such as sodium chloride (NaCl) and potassium chloride (KCl), may be added thereto. Further, a commercially available buffer solution such as a potassium hydrogenphthalate-type buffer solution, a potassium dihydrogenphosphate-type buffer solution, a sodium hydrogencarbonate-type buffer solution, and a sodium dihydrogenphosphatetype buffer solution, may be used as a base or main constituent of the liquid dispersion medium or vehicle.

On the other hand, in order to actively prevent the pH change in the ink, a salt comprising a metal of a small ionization tendency such as copper sulfate may also preferably be used as the buffer action-imparting electrolyte. In the present invention, such salt comprising a metal of a small ionization tendency may preferably be used in an amount of about 0.01-1 part per 100 parts of the liquid dispersion medium.

The reaction in this case may presumably be expressed by the following formulas.

anodic reaction:

$$SO_4^{2-} + H_2O \rightarrow H_2SO_4 + \frac{1}{2}O_2 + 2e^-$$

cathodic reaction:

$$Cu^{2+} + 2e^- \rightarrow Cu.$$

Thus, the metal of a small ionization tendency is deposited on the cathode whereby the alkalification of the ink caused by an ion of a metal of a large ionization tendency such as Na or K ion may be prevented.

The term "metal of a small ionization tendency" used herein refers to a metal which can be deposited by an cathodic reaction. More specifically, as the electrolyte, a salt comprising a metal having a smaller ionization tendency than aluminum, such as iron, nickel, tin, lead, copper, mercury, silver, and gold may preferably be used. These salts may be used singly or in a combination of two or more species, as desired. On the other hand, the term "metal of a large ionization tendency" used herein refers to a metal which can be contained in the ink and which cannot be deposited on an electrode, more specifically, a metal having a larger ionization tendency than aluminum, such as sodium and potassium.

In order to suppress the pH change in the entire ink, these two kinds of metal ions, i.e., the ion of a metal of a small ionization tendency and the ion of a metal of a large ionization tendency, are present in almost equal equivalents. Further, in the present invention, there may more preferably be used a combination comprising: the above-mentioned at least one of a weak acid, a weak acid salt, a weak base, and a weak acid salt; and the ion of a metal of a small ionization tendency. Incidentally, such electrolyte also has a function of imparting desired electro-conductivity to the ink.

In the present invention, an ionic surfactant may also be used as the buffer action-imparting substance. The buffer action of such ionic surfactant appears after a prescribed period of time counted from the time of electric conduction. Therefore, the ionic surfactant is particularly preferably used in a transfer recording because the adhesiveness of the ink may be retained for a certain period.

Hereinbelow, the buffer action of the ionic surfactant is described with reference to that of a fluorine-containing anionic surfactant.

When an anionic surfactant, is dissolved in water, the hydrophobic portion thereof becomes an anion as follows.

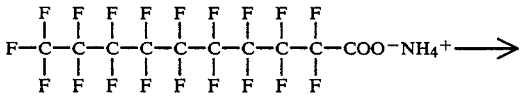

(carboxylate-type surfactant)

$CF_3(CF_2)_7CF_2COO^{\ominus} + NH_4^{\oplus}$

In a case where such anionic surfactant is contained in the image recording ink, on the cathode side, a reaction $2H^+ + 2e^- \rightarrow H_2\uparrow$ occurs whereby a hydrogen ion concentration $(H^+)$ decreases and $(OH^-)$ increases. However, this change is prevented by a reaction $OH^- + NH_4^+ \rightarrow NH_4OH$, on the basis of the $NH_4^+$ ion derived from the anionic surfactant.

As a result, the pH of the ink does not change even when a continuous recording based on electric conduction is effected. In order to promote the reaction, it is preferred to dissolve $NH_4OH$, as a weak base, in the ink. Therefore, when an anionic surfactant is used, it is preferred that the dispersion medium contains a weak base, particularly a weak base capable of being dissociated into a cation which is contained in the anionic surfactant. Preferred examples of such weak base may include $NH_4OH$, $Cu(OH)_2$, $Fe(OH)_3$, etc. Further, when a cationic surfactant is used, it is preferred that the dispersion medium contains a weak acid, particularly a weak acid capable of being dissociated into an anion which is contained in the cationic surfactant. Preferred examples of such weak acid may include $CH_3COOH$, $H_2CO_3$, $H_2S$, etc.

On the other hand, based on a reaction $2OH^- \rightarrow H_2O + \frac{1}{2}O_2\uparrow + 2e^-$ on the anode side, $(OH^-)$ decreases and $(H^+)$ increases whereby the pH value decreases. Thereafter, $H^+$ produced by the electrolysis of the water is consumed by a reaction $CF_3(CF_2)_7CF_2COO^{\ominus} + H^{\oplus} \rightarrow CF_3(CF_2)_7CF_2COOH$, whereby the pH value recovers the initial state.

On the anode side, as described above, the pH value once decreases, and a little time thereafter the pH value recovers the initial state. This phenomenon may be attributable to the size of the $CF_3(CF_2)_6CF_2COO^-$ of the anionic surfactant. Namely, as the size of the anion becomes larger, the period of time required for the recovery to the initial state becomes longer.

As described above, when an ionic surfactant is added to the image recording ink, the ink does not gelate on the cathode (or anode) side, but it initially solate on the anode (or cathode) side and a several minutes thereafter it recovers the initial pH value.

Further, by mixing an ionic surfactant with the image recording ink, the surface energy of the sol ink decreases whereby the transfer efficiency thereof increases. Furthermore, there may be obtained another effect such as improvement in image quality due to improvement in pigment dispersibility, and a decrease in evaporation loss of the liquid dispersion medium due to improvement in mixability of mutual ingredients thereof, or mixability thereof with the crosslinked substance.

Specific examples of the anionic surfactant may include, fatty acid alkali metal salts such as:

sodium laurate ($C_{11}H_{23}COONa$), sodium stearate ($C_{17}H_{35}COONa$), sodium oleate ($C_8H_{17}CH{=}CHC_7H_{14}COONa$), sodium pelargonate ($C_8H_{17}COONa$), sodium caprate ($C_9H_{19}COONa$), sodium undecylate ($C_{10}H_{21}COONa$), sodium tridecylate ($C_{12}H_{25}COONa$), sodium myristate ($C_{13}H_{27}COONa$), sodium pentadecylate ($C_{15}H_{31}COONa$), sodium palmitate ($C_{16}H_{33}COONa$), sodium margarate ($C_{16}H_{33}COONa$), sodium nonadecylate ($C_{18}H_{37}COONa$), sodium arachate ($C_{19}H_{39}COONa$), sodium heneicosanoate ($C_{20}H_{40}COONa$), sodium linoleate ($CH_3(CH_2)_4{=}CH{-}CH_2CH{=}CH(CH_2)_7COONa$), sodium linolenate ($CH_3CH_2CH{=}CHCH_2CH{=}CHCH_2CH{=}CH(CH_2)_7COONa$), sodium ricinoleate

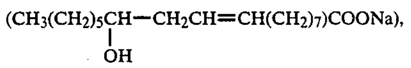

sodium licanate ($CH_3(CH_2)_3CH{=}CHCH{=}CHCH{=}CH{-}(CH_2)_4CO(CH_2)_2COONa$), and those wherein K (potassium) is substituted for Na, and or a halogen group is substituted for H (hydrogen) of the above mentioned fatty acid salts;

sulfuric acid ester salts such as:

sodium lauryl sulfate ($C_{12}H_{25}OSO_3Na$),
ammonium lauryl sulfate ($C_{12}H_{25}OSO_3^-.NH_4^+$), -continued sodium cetyl sulfate ($C_{16}H_{33}OSO_3Na$),
sodium stearyl sulfate ($C_{18}H_{37}OSO_3Na$),
sodium oleyl sulfate ($C_{18}H_{35}OSO_3Na$), Ziegler alcohol sulfuric acid ester sodium salt ($C_{12}H_{25}OSO_3Na$, $C_{14}H_{29}OSO_3Na$) mixture, sodium myrystyl sulfate ($C_{14}H_{29}OSO_3Na$),
sodium lauryl-ether sulfate ($C_{12}H_{25}O(CH_2CH_2O)_nSO_3Na$), sodium mono-lauryl glyceryl sulfate

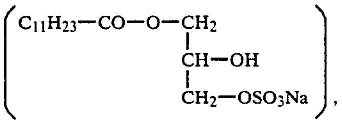

mono-oleyl diethylene glycol sulfate

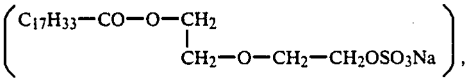

mono-cetyl glyceryl sulfate

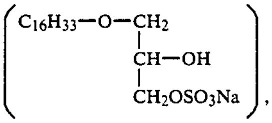

sodium mono-palmityl glyceryl sulfate

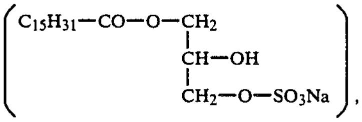

sodium mono-oleyl triethylene glycol sulfate
($C_{17}H_{33}-CO-O-CH_2-CH_2-O-CH_2-CH_2-O-CH_2-CH_2-O-SO_3Na$), sodium mono-lauroyl trimethylene glycol sulfate

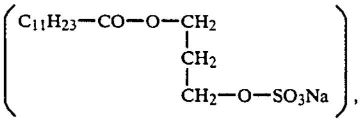

sodium mono-myrystyl propylene glycol sulfate

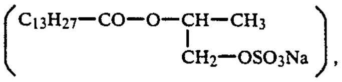

sodium mono-octyl diglyceryl sulfate

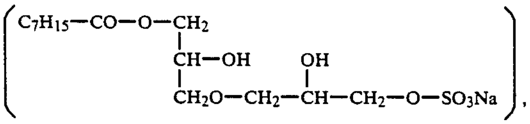

sodium mono-hexyl diglyceryl sulfate

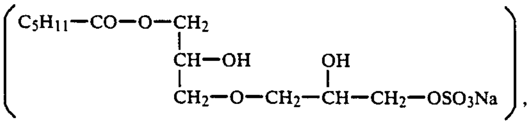

sodium mono-caproyl ethylene glycol sulfate

-continued

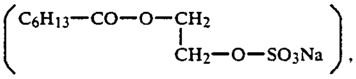

sodium mono-melissyl butylene glycol sulfate

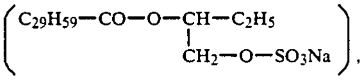

sodium mono-palmitoyl sorbitol sulfate

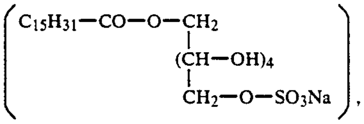

sodium α,β-dilauroyl sulfate

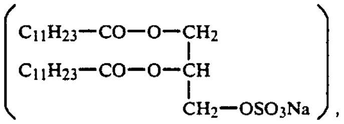

sodium sulfated mono-cetyl glyceride

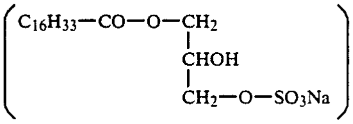

, and sodium sulfated mono-lauroyl mannitol

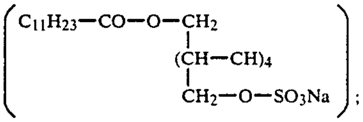

sulfonic acid salts such as, sodium alkylbenzene sulfonates 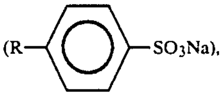

sodium dodecylbenzene sulfonate 

calcium dodecylbenzene sulfonate

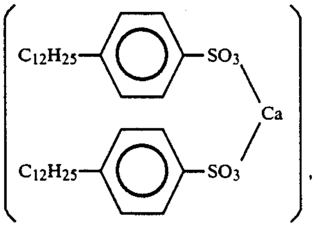

Igepon T

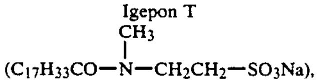

di-2-ethylhexyl sodium sulfosuccinate

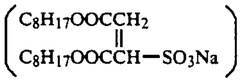

, and

-continued sodium dinaphthylmethane sulfonate

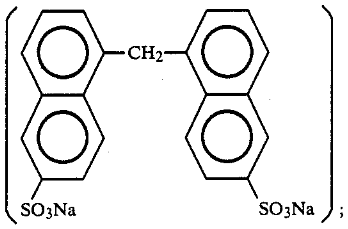

;

alkylbenzene phosphonic acid salts such as,

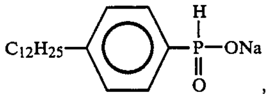

, etc.; and phosphoric acid ester salts such as,

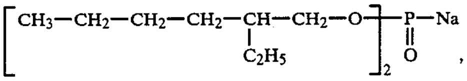

,

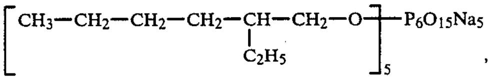

, and $(C_8H_{17}O)_5—P_6O_{15}Na_5$.

On the other hand, specific examples of the cationic surfactant may include:

amine salt-type or quaternary ammonium salt-type surfactants such as lauryltrimethylammonium chloride

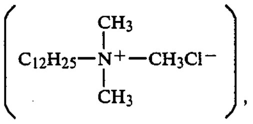

, lauryltrimethylammonium methylsulfate

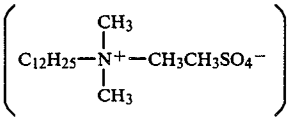

,

Soromine A

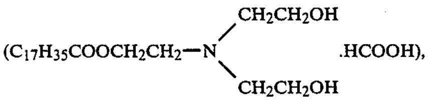

Sapamine A

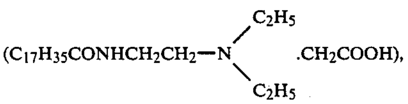

Alcovel A

-continued

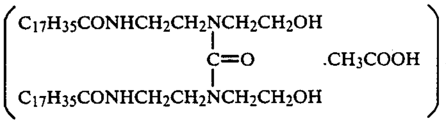

, lauryldimethylbenzylammonium chloride

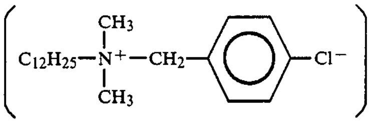

,

Sapamine MS

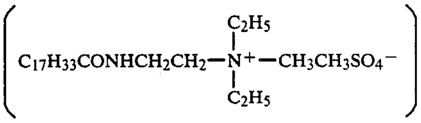

,

Sapamine BCH

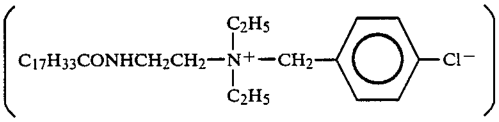

,

Catanac SN

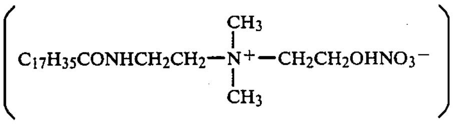

, cetyl pyridinium chloride

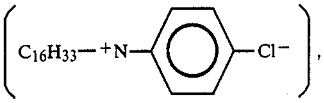

, cetyl pyridinium bromide

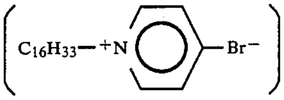

, and stearamidemethylpyridinium chloride

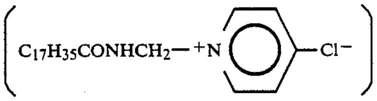

.

Further, specific examples of an ampholytic surfactnat may include:

sodium laurylaminopropionate ($C_{12}H_{25}NHCH_2CH_2COONa$), sodium stearylaminopropionate ($C_{18}H_{37}NHCH_2CH_2COONa$), and -continued lauryldimethylbetaine 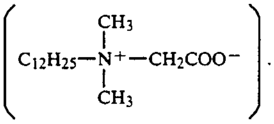

In the present invention, an anionic surfactant, a cationic surfactant or an ampholytic surfactant may be used as the ionic surfactant contained in the image recording ink. However, in a case where the ink solates at the anode to effect recording, the anionic surfactant may preferably be used. On the other hand, in a case where the ink solates at the cathode, the cationic surfactant may preferably be used. Further, the ampholytic surfactant may preferably be used in a case where the ink solates either at the anode or at the cathode.

The ionic surfactant may preferably be contained in the ink in an amount of 0.01-50%, more preferably 0.1-20%, particularly preferably 1-10%, based on the total weight of the ink. If the amount of the ionic surfactant is less than 0.01 wt. %, the effect thereof is insufficient. On the other hand, if the amount is more than 50 wt. %, the ink is difficult to be applied onto an ink-carrying member.

Further, in the present invention, a solid acid comprising a metal oxide may be used as the buffer action-imparting substance. As such metal oxide, compound oxide (or double oxide) may particularly preferably be used.

The reason for the effect of the solid acid on pH stability is not yet clear but may be considered, e.g., with reference to silica-alumina ($SiO_2$-$Al_2O_3$), as follows.

The solid acid of $SiO_2$-$Al_2O_3$ is neither a simple mixture of $SiO_2$ and $Al_2O_3$ crystals nor a sinter thereof, but may be considered to be an oxide wherein Al is randomly distributed in an $SiO_2$ skeleton. This $SiO_2$-$Al_2O_3$ exhibit a stronger acidity than a simple oxide of silica or alumina. For this reason, there has been most affirmatively accepted one which Thomas has proposed in view of a structural theory, e.g., as described in a monthly "Hyomen" (Surface), Vol. 21, No. 12, 43-53 pp (1983). According to this theory, in the following "Thomas's Model", when electric charges of +3, +4 and −2 are respectively imparted to Al, Si and O atoms, an excess negative charge of $-\frac{1}{4}$ is imparted to an Al-O bond on average. As a result, protons (hydrogen ions) for neutralizing these charges are produced thereby to originate the acidity.

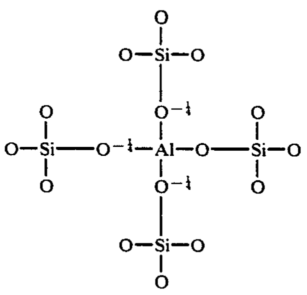

On the other hand, according to a cathodic reaction $H^+ + e^- \rightarrow \frac{1}{2}H_2\uparrow$, $H^+$ is generally consumed whereby $OH^-$ becomes excess and the gelation is promoted. However, when the silica-alumina is present, it produces $H^+$ as described above. Therefore, the excess $OH^-$ is decreased due to a reaction $H^+ + OH^- \rightarrow H_2O$, to resume the initial pH state, whereby the promotion of the gelation is prevented.

Further, according to an anodic reaction $2OH^- \rightarrow H_2O + \frac{1}{2}O_2 + 2e^-$, $OH^-$ is consumed whereby $H^+$ becomes excess and solation occurs. However, this reaction occurs only in the vicinity of the electrode and the sol portion is transferred to a transfer-receiving medium to be used for image formation whereby the pH change in the ink becomes very little.

According to the above-mentioned reason, the pH value of the entire ink is stably controlled, whereby the viscoelasticity and adhesiveness of the ink may be retained constantly.

In the present invention, solid acid powder produced by pulverization may preferably be used. This powder may preferably be uniformly dispersed in the ink. Because the ink of the present invention is a gel-type ink having viscoelasticity, the solid acid powder is suitably held in the crosslinked structure of the ink whereby ununiform dispersion state due to sedimentation does not occur.

Specific examples of the solid acid of a metal oxide used in the present invention may include: simple oxides such as $Al_2O_3$, ZnO, $TiO_2$, $CeO_2$, $As_2O_3$, $V_2O_5$, $Cr_2O_3$ and $MoO_3$; or compound oxides such as $SiO_2$-$Al_2O_3$, $B_2O_3$-$Al_2O_3$, $Cr_2O_3$-$Al_2O_3$, $MoO_3$-$Al_2O_3$, $ZrO_2$-$SiO_2$, $Ga_2O_3$-$SiO_2$, BeO-$SiO_2$, MgO-$SiO_2$, CaO-$SiO_2$, SrO-$SiO_2$, $Y_2O_3$-$SiO_2$, $La_2O_3$-$SiO_2$, $SnO_2$-$SiO_2$, PbO-$SiO_2$, MgO-$B_2O_3$ and $TiO_2$-ZnO. These solid acids may be used singly or in a mixture of two or more species.

In the present invention, the solid acid may preferably be contained in an amount of 0.1-20 wt. %, more preferably 0.6-10 wt. %, based on the weight of the entire ink. If the solid acid content is less than 0.1 wt. %, the effect thereof on the stabilization of the ink pH value is not sufficient, and the ink pH can be increased in repeated use whereby the ink is hardened and the layer-forming property thereof becomes poor. On the other hand, if the solid acid content exceeds 20 wt. %, the fluidity of the ink decreases and the layer-forming property thereof also becomes poor.

In order to disperse the solid acid, a known dispersing device such as roll mill, kneader and attritor can be used.

The fluid ink of the present invention comprises a liquid dispersion medium, a crosslinked substance and a buffer action-imparting substance, as described above, and may further comprise, as desired, a coloring agent or colorant inclusive of dye, pigment and colored fine particles, a color forming compound capable of generating a color on energy application, or another additive such as an antifungal agent or an antiseptic.

The coloring agent may be any of dyes and pigments generally used in the field of printing and recording, such as carbon black. Among these, a dye or pigment, particularly a pigment, having a relatively low affinity to the liquid dispersion medium is preferably used in order to suppress the coloring of a transfer-receiving medium, i.e., an intermediate transfer medium or a recording medium, due to the transfer thereto of the liquid dispersion medium under no electric conduction. The pigment or dye may preferably be used in a proportion of 0.1 part or more, more preferably 1-30 parts, particularly preferably 1-10 parts, per 100 parts of the liquid dispersion medium.

Further, the colorant may be in the form of fine colored particles, like a toner of various colors for electrophotography, obtained by dispersing a pigment or dye as described above in a natural or synthetic resin and forming the dispersion into fine particles. A fluid ink containing such colored particles behaves like a dilatant liquid and is particularly preferred in respect of suppressing the transfer of the liquid dispersion medium to or coloring of the transfer-receiving medium under no electric conduction.

The colored fine particles may preferably be used in a proportion of 1 part or more, further preferably 5–100 parts, particularly preferably 20–80 parts, per 100 parts of the liquid dispersion medium. Generally speaking, it is preferred that colored particles having a large size are incorporated in a higher proportion in order to provide a better coloring characteristic. Further, in the present invention, the above-mentioned toner particles may be used without considering their electrophotographic characteristics such as a charging characteristic.

The colorant inclusive of the pigment or the colored fine particles may preferably have a particle size of 0.01–100 μm, particularly 0.01–20 μm.

If the particle size is below 0.01 μm, the colorant particles are not retained in the crosslinked structure but are transferred together with the liquid dispersion medium even when the ink contacts the intermediate transfer medium, etc., under no energy application, whereby an image fog is liable to result. On the other hand, if the particle size exceeds 100 μm, a resolution required for an ordinary image is not satisfied.

On the other hand, it is possible to use a color forming compound similarly as a dye or pigment as described above. The color forming compound may be those generally known as heat-sensitive color former or pressure-sensitive color former, i.e., those capable of forming color under the action of an acid or heat, and an ink containing such a coloring forming agent can be selectively subjected to color-development on application of an energy pattern.

Specific examples of such color forming compound may include: triphenylmethane-phthalide-type compounds, fluoran-type compounds, phenothiazine-type compounds, indolylphthalide-type compounds, leucoauramine-type compounds, spiropyran-type compounds, Rhodamine-lactam-type compounds, triphenylmethan-type compounds, azaphthalide-type compounds, chromanoindole-type compounds and the like, triazene-type compounds and the like, and naphthalic acid-type compounds. These compounds may be used singly or as a combination of two or more species.

The color forming compound may be encapsulated and dissolved or dispersed in the liquid dispersion medium whereby it may be directly developed according to an electrochemical reaction based on the transfer of electrons in the vicinity of a recording electrode. Further, the color forming compound may be caused to contact a solid acid such as phenol whereby the ink which is to be transferred to a transfer-receiving medium, an intermediate transfer medium or a recording medium (i.e., a final transfer medium), may be selectively subjected to color development.

In view of the stability against heat, acid or an organic a solvent, however, the colorant used in the present invention may preferably be pigment or dye or colored particles as described above, in combination with the above-mentioned color forming compound, as desired.

The image recording ink according to the present invention may be obtained from the above components, for example, by uniformly mixing a liquid dispersion medium such as water, a crosslinked substance, such as a hydrophilic polymer, a buffer action-imparting substance, and also an optional additive such as a crosslinking agent, a colorant, etc., under heating as desired, to form a viscous solution or dispersion, which is then cooled to gel the same.

Incidentally, when colored particles such as toner particles are used as a colorant, it is preferred that a crosslinked substance and a liquid dispersion medium are first mixed under heating to form a uniform liquid, and then the colored particles are added thereto. In this case, it is further preferred that the addition of the particles is effected in the neighborhood of room temperature so as to avoid the agglomeration of the particles.

Then, there is described a method of applying an electric current to the ink of the present invention.

In a case where a pH change is imparted to the ink by using an electrode, the pH change does not diffuse three-dimensionally like heat, but selectively diffuses in the direction of the ink depth (i.e., in the direction of the current), whereby the clearness of the resultant ink pattern (e.g., sharpness and image quality) may be enhanced.

Incidentally, when a recording is effcted by using a pH change based on electric conduction, the anode material can be dissolved due to electrolysis. Accordingly, when the recording electrode is an anode, it is preferred to use an inert metal such as platinum, as the material for the recording electrode. In such case, however, fine or micro fabrication such as photolithoetching is required. As a result, e.g., by using electron-beam deposition or sputtering, the production cost relatively tends to increase.

On the other hand, in a case where the recording electrode is a cathode, the above-mentioned fine fabrication is not required whereby the production cost may preferably be reduced. As the ink which can be used in such cathodic recording, there may preferably be used an ink comprising a peptide compound such as a protein, and an aqueous dispersion medium, wherein the initial or unused pH value is higher than the isoelectric point of the peptide compound, e.g., by adding an aqueous alkaline solution thereto.

Hereinbelow, there will be described an embodiment of the image recording method using the image recording ink of the present invention as described above.

Referring to FIG. 1 which is a partial schematic sectional view taken across the thickness of a transfer-receiving medium showing an embodiment of the recording apparatus used in such recording method, an ink 2 contained in an ink container 13 is carried on the surface of a cylindrical ink-carrying roller 1 of which the surface comprises, e.g., stainless steel, and conveyed in an arrow B direction along with the rotation in the arrow A direction of the roller 1.

The ink 2 moved in this way is supplied with a pattern of voltage corresponding to an image signal from a recording electrode 5 at an energy application position where the ink 2 contacts the electrode 5. A current corresponding to the voltage flows from the recording electrode 5 to, e.g., the ink-carrying roller 1 connected to the earth 11, through the ink 2, whereby the ink 2 is selectively imparted with an adhesiveness, e.g., because of a change in crosslinking structure through an electrochemical reaction in the ink 2.

A portion of the ink 2 selectively imparted with an adhesiveness is further moved in the arrow B direction to reach an ink transfer position where the layer of the ink 2 contacts an intermediate transfer roller 6 which is composed of a cylinder of iron coated with a hard chromium plating and is disposed with a certain spacing from the ink-carrying roller 1 at the ink transfer position.

At the ink transfer position, the adhesive portion of the ink 2 to which the above-mentioned selective adhesiveness is imparted is transferred onto the intermediate transfer medium 6 rotating in the arrow C direction to form an ink pattern 2*b* thereon.

The ink pattern 2*b* is then conveyed along with the rotation in the arrow C direction of the intermediate transfer roller 6 to reach an ink pattern-transfer position where the roller 6 confronts a platen roller 7 by the medium of a recording medium 8.

At the ink pattern-transfer position, a recording medium 8 of, e.g., plain paper being conveyed in the direction of an arrow D, is disposed in contact with the surface (i.e., a surface on which the ink pattern is formed) of the intermediate transfer roller 6. Further, the platen roller 7 as a transfer means having a surface of, e.g., silicon rubber is disposed opposite to the roller 6 rotating in the direction of an arrow E so as to movably sandwich the recording medium 8 with the intermediate transfer roller 6.

At the ink pattern-transfer position, the ink pattern 2*b* formed on the intermediate transfer medium 6 is transferred to the recording medium 8 thereby to form a transferred image 2*c*.

The remainder of the ink 2 not transferred to the intermediate transfer roller 6 at the ink transfer position is further conveyed in the arrow B direction to be separated from the intermediate transfer roller 6 because of its non-adhesiveness and the action of a gravity, etc., and recycled to the ink container 13 for reuse.

While a representative embodiment of the image recording apparatus or method according to the present invention has been described above, upstream from the energy application position where the recording electrode 5 faces the ink-carrying roller 1, a blade 18 as an ink layer thickness-regulation means for regulating the thickness of a layer of the ink 2 on the roller 1 may be disposed as shown in FIG. 1, as desired.

Further, in a case where a transfer rate of 100% is not attained with respect to the transfer of the ink pattern 2*b* from the intermediate transfer roller 6 to the recording medium 8 such as plain paper, it is preferred to dispose a cleaning means 19 having a blade 19*a* of, e.g., urethane rubber as shown in FIG. 1 to remove residual ink on the intermediate transfer roller 6.

Further, when a transferred pattern 2*c* formed on the recording medium 8 is not sufficiently fixed on the recording medium 8, it is possible to dispose a known fixing means by way of heating, pressing, etc., (not shown) at a point downstream from the ink image-transfer position along the recording medium 8.

Then, there will be described another embodiment of an image recording method using the ink according to the present invention, with reference to a sectional view of FIG. 2 and a perspective view of FIG. 3.

Figure 2:
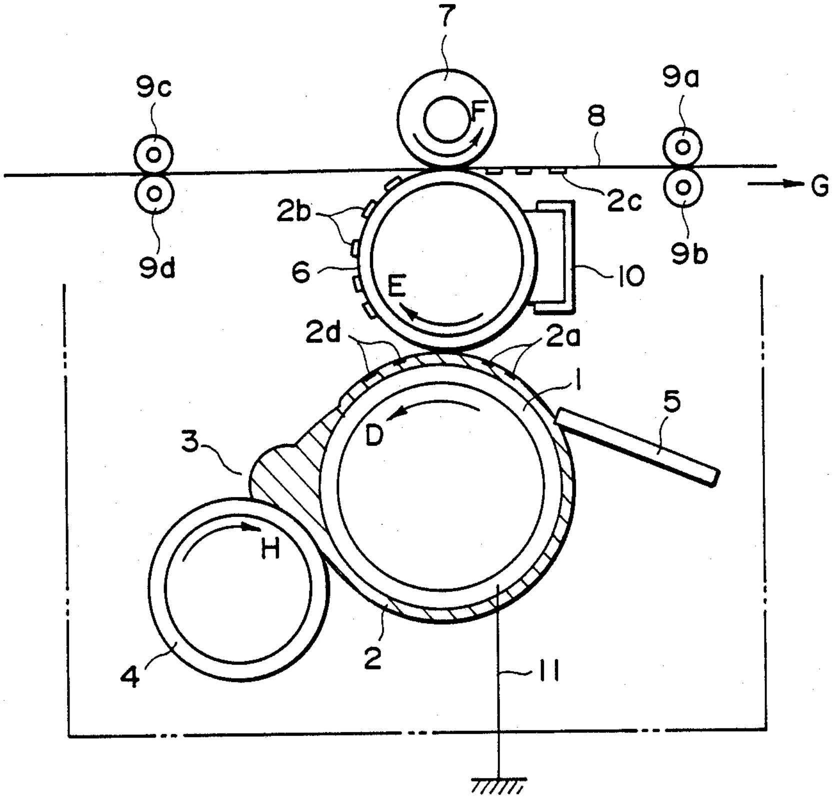

Referring to FIG. 2, a gel ink 2 of the present invention is carried on an ink-carrying roller 1 and conveyed along with the rotation in the arrow D direction of the roller 1. The ink 2 moved in this way forms an ink reservoir 3 by means of a coating roller 4 rotating in the arrow H direction, and the ink 2 stored in the ink reservoir 3 is formed into a layer having a certain thickness on the surface of the ink-carrying roller 1.

The ink 2 is supplied with pattern of voltage corresponding to an image signal from a recording electrode 5 at an energy application position where the ink 2 contacts the electrode 5. A current corresponding to the voltage flows from the recording electrode 5 to, e.g., the ink-carrying roller 1 connected to the earth 11, through the ink 2, whereby the ink 2 is selectively imparted with an adhesiveness to form an adhesive portion 2*a*. The portion 2*a* of the ink 2 selectively imparted with an adhesiveness is further moved in the arrow D direction to reach an ink transfer position where the layer of the ink 2 contacts an intermediate transfer roller 6. At the ink transfer position, the adhesive portion of the ink 2 (i.e., at least a part of the ink 2 constituting the ink layer) to which the above-mentioned selective adhesiveness is imparted is transferred onto the intermediate transfer medium 6 to form an ink pattern 2*b* thereon.

The ink pattern 2*b* is then conveyed along with the rotation in the arrow E direction of the intermediate transfer roller 6, and is transferred to a recording paper 8 under the action of a platen roller 7 rotating in the arrow F direction, thereby to form a transferred image 2*c*. The recording paper 8 on which the transferred image 2*c* is formed is conveyed in the arrow G direction by means of pairs of conveying rollers 9*a*, 9*b* and 9*c*, 9*d*.

After the ink pattern 2*b* is transferred to the recording paper 8, the remainder ink remaining on the surface of the intermediate transfer roller 6 is removed by means of a cleaning means 10, e.g., comprising a sponge and the intermediate transfer roller 6 is again provided for forming a new ink pattern 2*b*. The remainder of the ink 2 (inclusive of a portion 2*d*) not transferred to the intermediate transfer roller 6 at the ink transfer position is further conveyed in the arrow D direction to be separated from the intermediate transfer roller 6 because of its non-adhesiveness and the action of a gravity, etc., and recycled to the ink reservoir 3 for reuse.

The ink 2 inclusive of the ink portion 2*d* recycled to the ink reservoir 3 is uniformly stirred by the rotation in the arrow D direction of the ink-carrying roller 1 and that in the arrow H direction of the coating roller 4. Thereafter, the ink 2 is again formed into a layer having a certain thickness and may be subjected to the process for recording.

In the above-mentioned ink pattern formation step wherein the ink 2 is selectively transferred to the intermediate transfer roller 6 to form an ink pattern 2*b*, a somewhat negative shear force is applied at the point of separation between the intermediate transfer roller 6 and the ink layer. For this reason, it is preferred to make the peripheral speed of the intermediate transfer roller 6 smaller than (or equal to) the peripheral speed of the ink-carrying roller 1 so as to apply a shear force based on the difference in peripheral speed, in respect of stabilization of separation of the ink layer and the intermediate transfer roller 6.

Because the ink 2 is one in the form of a gel, in a broad sense, comprising a crosslinked substance impregnated with and holding therewith a liquid dispersion medium, it is presumed that the gel ink is not substantially transferred to the intermediate transfer medium 6 on no energy application.

When a crosslinked substance comprising guar gum or polyvinyl alcohol crosslinked with borate ions, the amount of current required for breaking at least a part of the crosslinked structure is only such an amount as required for causing transfer of electrons from crosslinking agent (e.g., the above-mentioned borate ions) which is generally used in a considerably small amount, e.g., on the order of several hundred ppm of the ink.

The above amount of current is almost 1/10 of the amount of current required by a thermal head, so that a low energy consumption recording may be effected by using such an electrochemical change.

Figure 4:
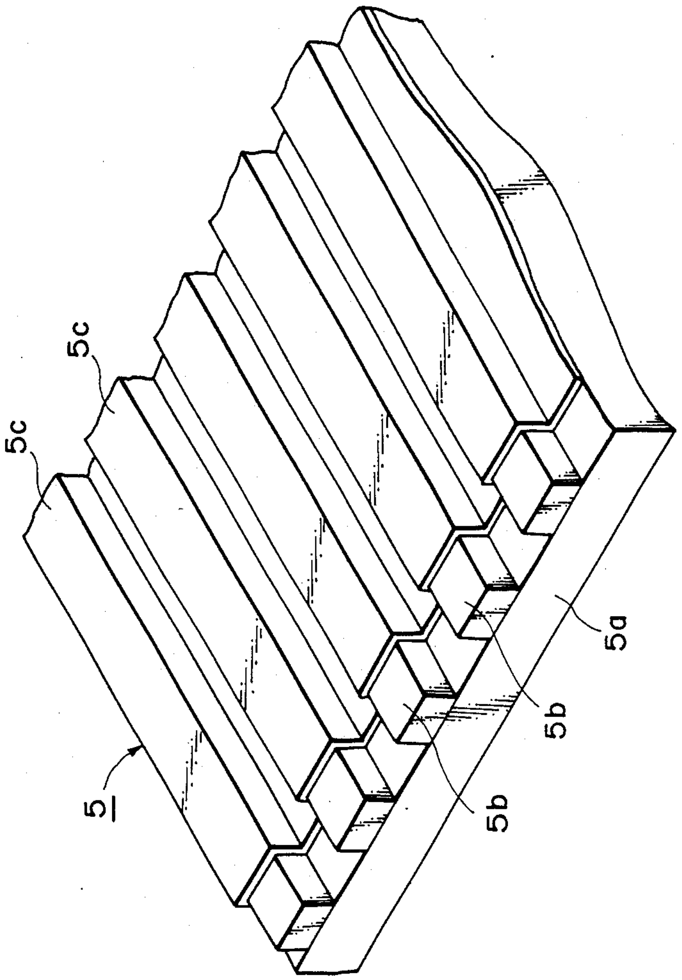
FIGS. 4 is an enlarged partial perspective view of a recording head used in the apparatus shown in FIG. 1 or 2.

The recording head 5 may preferably take a form of recording electrode as shown in FIG. 4, an enlarged partial perspective view thereof. With reference to FIG. 4, the recording electrode 5 may be obtained by forming a plurality of electrode elements 5b of a metal such as platinum or gold on a substrate 5a, and coating the electrode elements 5b except for the tip portions thereof contacting the ink with an insulating film 5c of polyimide, etc. The electrode elements 5b may preferably comprise an electroless plating of Pt in view of the adhesion to the substrate 5a and the durability thereof.

In an embodiment already explained with reference to FIGS. 1 to 3, a current is passed between the recording electrode 5 and the ink-carrying roller 1, but it is also possible that a current is passed between an adjacent pair of the plurality of electrode elements 5b on the recording electrode 5.

Hereinabove, there are mainly described embodiments of the present invention wherein an ink in the form of a gel (in a broad sense) is supplied with electric conduction to change it into a sol or adhesive state. In the present invention, however, it is possible to use an ink which is in the form of a sol having adhesiveness or adhesion on no electric conduction, e.g., by making its pH acidic. Such ink may be selectively or patternwise formed into a gel having no adhesiveness, e.g., by imparting an electrochemical energy thereto, thereby to form an ink pattern.

As described hereinabove, by using the image recording ink according to the present invention, image recording is easily effected at an extremely low recording cost than the thermal transfer recording method and free from plugging of a nozzle or blurring of recorded images as encountered in the ink jet recording method.

Especially, according to a preferred embodiment of the present invention wherein the crosslinked structure of an ink is changed by passing a current therethrough, image recording can be effected at an amount of current which is about 1/10 of that required in the conventional thermal transfer method using a thermal head, whereby the recording cost can be remarkably reduced also in respect to energy consumption.

Further, in the image recording ink of the present invention, the pH value thereof can be retained and the viscoelasticity is not changed even in continuous use. As a result, clear images may be constantly obtained even when the ink is continuously used.

Hereinbelow, the present invention will be explained with reference to Examples.

EXAMPLE 1

| <A> | |
|---|---|
| 0.1 mol/l aqueous potassium dihydrogenphosphate ($KH_2PO_4$) solution | 50 parts |
| 0.1 mol/l aqueous sodium hydroxide solution | 46.8 parts |
| water | 3.2 parts |

The above ingredients were mixed to prepare parts of a buffer solution (pH 8.0).

| <B> | |
|---|---|
| The buffer solution (pH 8.0) prepared above | 100 parts |
| Guar gum (Emco Gum (trade name) mfd. by Meyhall, Switzerland) | 1 part |
| Sodium borate ($Na_2B_4O_7.10H_2O$) | 0.05 part |

The above ingredients were uniformly mixed under heating at 90° C. and then left standing at room temperature to form a gel ink retaining a high percentage of water and having an indefinite shape, i.e., a fluidity.

The pH of the gel ink was lowered to below 7 by the addition of hydrochloric acid to be once converted into a viscous sol, into which 50 parts of toner particles of 10 μm size (cyan toner, before addition of externally added fluidity improver, for NP color copier, mfd. by Canon K.K.) prepared by uniformly dispersing a phthalocyanine pigment in a polyester resin, were added and uniformly mixed. Then, the mixture was again brought to a pH 8.3 by the addition of an aqueous NaOH solution to obtain a gel ink in the form of sludge.

The viscosity change in the gel ink prepared above was examined while changing the pH value of the ink. Thus, the viscosity was measured by means of a rotational viscometer (Vismetron Model VS-A1, mfd. by Shibaura System K.K.) with a stainless steel (SUS 27) rotor of about 3 mm in diameter at rotor speed of 0.6 rpm, at normal temperature (25° C.), whereby a pH-viscosity curve as shown in FIG. 6 was obtained.

In a case where the gel ink was used in image formation as described hereinafter, good transferred images were obtained when the rate of the viscosity change was −50% to +100% (more preferably −30% to +30%) in terms of the rate (B-A/A, as described hereinbefore) of the amount of change (B-A) to the initial viscosity (A) at pH=8.3.

Figure 6:
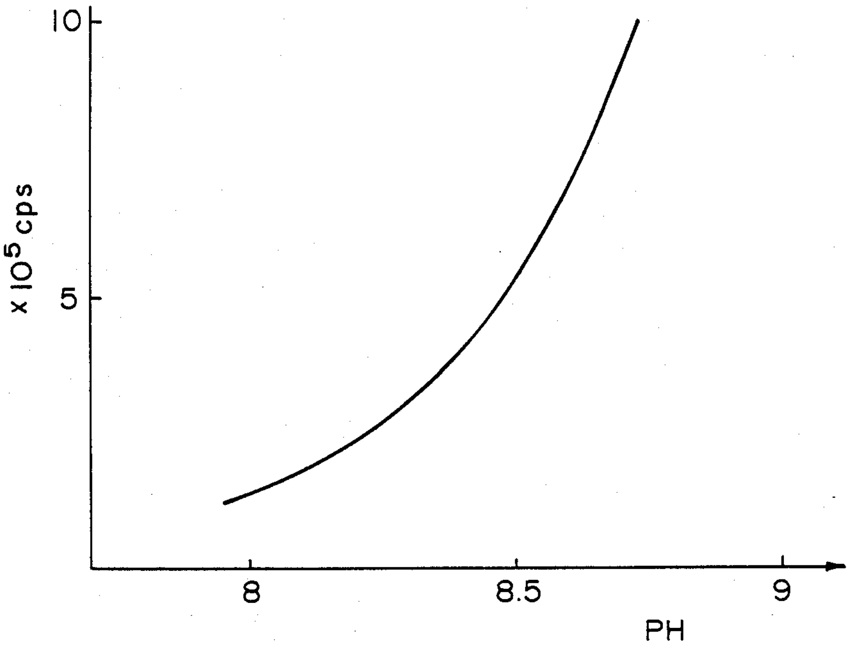
FIG. 6 is a graph showing a pH-viscosity change curve in the ink of Example 1.

In the instance as shown in FIG. 6, such rate of the viscosity change almost corresponded to the amount of the pH change of −0.3 to +0.3 (more preferably −0.1 to +0.1) in terms of the amount of the pH change counted from the initial pH value. Therefore, it was preferred that the ink was stabilized within such pH range.

Then, by using the above-mentioned gel ink, image formation was effected as follows.

The sludge ink 2 was charged in an apparatus as shown in FIG. 1 wherein an ink-carrying roller 1 comprising a cylindrical roller of 20 mm in diameter having a surface of stainless steel with a surface roughness of 1S and an intermediate transfer roller 6 comprising an iron cylindrical roller of 20 mm in diameter having a surface coated with a hard chromium plating were disposed opposite to each other with a gap of 2 mm at the ink transfer position. The sludge ink 2 obtained above was charged in the ink container 13.

The ink-carrying roller 1 was rotated in the arrow A direction at about 60 rpm to form thereon a layer of the ink 2, and in contact with the ink layer 2, the intermediate transfer roller 6 was rotated in the arrow C direction at about 50 rpm. In this instance, when electric energy was not supplied from a recording head 5 to the ink layer 2, a very slight amount of water was transferred to the intermediate transfer roller 6, but the ink 2 was not substantially transferred to the transfer roller 6. The recording head 5 had a structure as shown in FIG. 4, wherein each electrode element **5*b* of copper was coated with a polyimide insulating film 5*c*** except for a tip thereof which was coated with Au plating in an area of 100 μm×100 μm.

On the other hand, when a pulse of 40 V and 500 μsec was applied through the ink layer 2 between the recording head 5 as the anode and the ink-carrying roller 1 as the cathode to pass a current of about 2.5 mA per each electrode element **5*b*, the ink 2 was selectively transferred to the transfer roller 6 to form an ink pattern 2*b*** thereon.

At the ink image transfer position, a platen roller 7 of a 12 mm-dia. iron cylindrical roller surfaced with 4 mm-thick silicone rubber layer was disposed opposite to the intermediate transfer roller 6 with a recording medium 8 of plain paper disposed therebetween moving in the arrow D direction. Further, the platen roller 7 was rotated in the arrow E direction at the same speed as the transfer roller 6 while exerting a slight pressure onto the recording medium 8. As a result, cyan-colored dot images each of about 100×150 μm in size were formed on the recording medium 8.

The ink of this Example was excellent in long-term storage stability and stability in pH during a continuous application of signals (i.e., excellent in viscosity stability of the entire ink), as described hereinafter.

COMPARATIVE EXAMPLE 1

A fluid ink was prepared in the same manner as in Example 1 except that 100 parts of water was used instead of 100 parts of the buffer solution of the prescription A in the Example 1.

The above-mentioned inks of Example 1 and Comparative Example 1 were stored at 40° C. for 2 weeks, and thereafter the viscosities of these inks were measured. As a result, the viscosity of the ink of Example 1 was not substantially changed. On the other hand, the viscosity of ink of the Comparative Example 1 was decreased due to the storage, and the ink partially solated and the pH thereof was decreased.

Further, 1 cm$^3$ of 0.1N-HCl was added to 100 g of the respective inks. As a result, the pH of the ink of Example 1 was 8.2 (initial pH=8.3). On the other hand, the ink of Comparative Example 1 showed a pH value of 7.5 and the viscosity thereof was considerably decreased.

EXAMPLE 2

| <C> | |
|---|---|
| Water | 100 parts |
| Copper sulfate ($CuSO_4.5H_2O$) | 0.06 part |

An ink (pH=8.3) was prepared in the same manner as in Example 1 except that a copper sulfate solution prepared by uniformly mixing the above ingredients of the prescription C was used instead of the buffer solution of the prescription A in the Example 1. Further, in this ink, the amount of NaOH was controlled so that the equivalent of the copper ions produced from the copper sulfate was almost equal to that of sodium ions produced from the sodium borate, the NaOH for adjusting the viscosity, etc.

By using the thus prepared ink, image formation was effected in the same manner as in Example 1 whereby almost the same results as in Example 1 were obtained. In this image formation, the viscosity of the entire ink was stable during the signal application, while a very small amount of copper was attached to the surface of the ink-carrying roller 1 after use.

Incidentally, sodium sulfate $CuSO_4$ generally tended to be precipitate as copper hydroxide $Cu(OH)_2$ in an alkaline region. In this instance, however, there was applied a relatively high voltage as compared with a general electrochemical reaction, whereby the copper was deposited on the cathode. Further, it was preferred to use ammonia for adjusting the ink pH because the copper hydroxide was dissolved as $Cu(NH_3)_4(OH)_2$.

EXAMPLE 3

| | |
|---|---|
| Propylene glycol | 800 g |
| Water | 200 g |
| Polyvinyl alcohol (Gohsenol GL 03, mfd. by Nihon Gosei Kagaku K.K.) | 240 g |
| Potassium iodide | 140 g |
| Carbon black (Stering R, mfd. by Cabot Co., U.S.A.) | 100 g |
| Butyl para-hydroxybenzoate (antiseptic) | 1 g |
| Ammonium salt of perfluoroalkyl-carboxylic acid (Surflon S-111, mfd. by Asahi Glass K.K.) | 195 g |

The above ingredients were uniformly mixed under heating at 80° C., and 175 g of colloidal silica (trade name: Aerosil R200, mfd. by Nihon Aerosil K.K.) was added thereto and mixed. To 100 g of the resultant mixture, 1.2 g of borax was added and mixed thereby to prepare an ink of the present invention in the form of a gel at room temperature.

In the thus prepared gel ink, it was assumed that the OH groups of the polyvinyl alcohol were crosslinked by the borate ions.

On the surface of a part of the ink prepared above, an aluminum foil of 5 cm×5 cm in size was placed gently and was left standing as it is for 1 min. in an environment of a temperature of 25° C. and a moisture of 60%. Then, the aluminum foil is gently peeled off from the surface of the ink and then quickly weighed accurately to measure the increase in weight of the aluminum foil. As a result, there was substantially no weight increase of the aluminum foil (i.e., a weight increase of less than 0.1 g).

Figure 3:
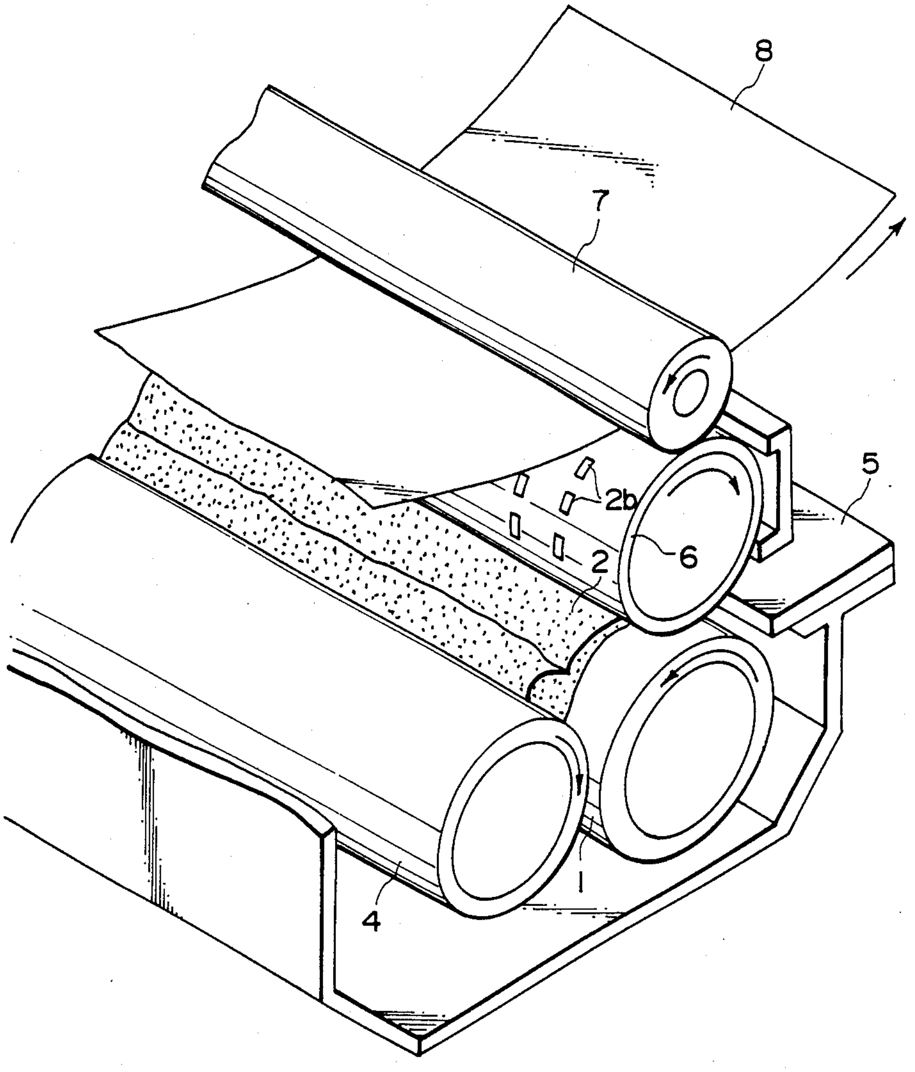
FIG. 3 is a perspective view of the recording apparatus shown in FIG. 2.

By using the thus prepared ink, image recording was effected or roll paper in the following manner by means of a device as shown in FIGS. 2 and 3.

The gel ink 2 in the total amount of 40 g was charged in an apparatus as shown in FIG. 2 wherein an ink-carrying roller 1 and a coating roller 4 were disposed opposite to each other with a gap of 1 mm.

The ink-carrying roller 1 was rotated in the arrow D direction at a peripheral speed of 20 mm/sec, and the coating roller 4 was rotated in the arrow H direction at a peripheral speed of 24 mm/sec, whereby a layer of the ink 2 having a thickness of about 1.2 mm and a coating width of 60 mm was formed on the ink-carrying roller 1.

The recording head 5 had a structure wherein each electrode element **5*b* of a plating of Pt was coated with a polyimide insulating film 5*c*** except for a tip thereof which had an area of 1 mm×1 mm.

When a pulse of +25 V and 25 msec was applied through the ink layer 2 between the recording head 5 as the anode and the ink-carrying roller 1 as the cathode, the ink 2 was selectively transferred to the transfer roller 6 to form an ink pattern 2*b* thereon. Then, the ink pattern 2*b* was transferred to a recording medium 8 of roll paper to form a transferred image 2*c*.

The image recording was effected in this manner on the roll paper 8 whereby there was obtained a printed portion had a width of 50 mm wherein the area rate of the actually printed images was 50%. Thus, the roll paper 8 having a length of 150 m (corresponding to about 500 sheets of A-4 paper, with respect to its vertical length) was printed, whereby there were obtained good images having substantially no variation in image density and resolution.

With respect to the gel ink, the change in pH values was examined by means of a pH test paper. In order to measure the pH value, an ink according to the present invention was prepared in the same manner as described above except that the carbon black was not used. As a result, the pH value of the ink was 8.0 before electric conduction, and the pH value was 8.0 even after image recording was effected in a length of 150 m on the roll paper. Accordingly, the pH value was not substantially changed.

EXAMPLE 4

An image recording ink according to the present invention was prepared in the same manner as in Example 3 except that 160 g of an anionic surfactant (Pelex SSH, mfd. by Kawo Sekken K.K.) was used instead of the anionic surfactant (Surflon S-111).

By using the thus prepared ink, experiments inclusive of image recording were conducted in the same manner as in Example 3, whereby substantially the same result as in Example 3 was obtained.

EXAMPLE 5

An image recording ink according to the present invention was prepared in the same manner as in Example 3 except that a mixture comprising 95 g of Surflon S11 and 33 g of Surflon S111-S was used instead of the anionic surfactant (Surflon S-111).

By using the thus prepared in, experiments inclusive of image recording were conducted in the same manner as in Example 3, whereby substantially the same result as in Example 3 was obtained.

For example, in order to measure the pH value, an ink was prepared in the same manner as described above except that the carbon black was not used. As a result, the pH value of the ink was 8.5 before electric conduction, and the pH value was not changed even after image recording was effected in a length of 150 m on the roll paper.

COMPARATIVE EXAMPLE 2

An image recording ink was prepared in the same manner as in Example 3 except that a 1N-NaOH solution was used so as to adjust the pH of the entire ink to the same as that in Example 3 (pH 8.5), instead of the anionic surfactant used in Example 3.

By using the thus prepared ink, experiments inclusive of image recording was conducted in the same manner as in Example 3. As a result, an image having a somewhat low image density as compared with Example 3 was formed in the initial stage. However, a disorder in image occurred as the printing continued, and the ink was hardened and could not provide a clear image when the roll paper was printed in a length of about 15 m.

Further, in order to measure the pH value, an ink was prepared in the same manner as described above except that the carbon black was not used. As a result, the pH value of the ink was 8.5 before electric conduction, but the pH value was changed to 11.0 after the roll paper was printed in a length of about 15 m.

EXAMPLE 6

| | |
|---|---|
| Propylene glycol | 20 g |
| Water | 6 g |
| Polyvinyl alcohol (Gohsenol GL 03, mfd. by Nihon Gosei Kagaku K.K.) | 6 g |
| Potassium iodide | 3.5 g |
| Carbon black (Stering R, mfd. by Cabot Co., U.S.A.) | 2.5 g |

The above ingredients were uniformly mixed under heating at 80°-90° C., and 3 g of colloidal silica (trade name: Aerosil 200, mfd. by Nihon Aerosil K.K.) and 3 g of a solid acid of silica-alumina (trade name: N633 HN, $Al_2O_3$ content of 28 wt. %, mfd. by Nikki Kagaku K.K.) were added thereto and sufficiently dispersed. To the resultant mixture, 2.5 g of a 20 wt. % solution (in terms of a weight ratio ($Na_2B_4O_7.10H_2O$)/($Na_2B_4O_7.10H_2O$+propylene glycol)) prepared by dissolving sodium tetraborate decahydrate ($Na_2B_4O_7.10H_2O$) in propylene glycol was added to form a gel, into which 0.3 g of a 1N-NaOH solution was further dropped thereby to prepare an ink in the form of a gel.

On the surface of a part of the ink prepared above, an aluminum foil of 5 cm×5 cm in size was placed gently and was left standing as it is for 1 min. in an environment of a temperature of 25° C. and a moisture of 60%. Then, the aluminum foil is gently peeled off from the surface of the ink and then quickly weighed accurately to measure the increase in weight of the aluminum foil. As a result, there was substantially no weight increase of the aluminum foil (i.e., a weight increase of less than 0.1 g).

By using the thus prepared ink, image recording was effected in the following manner by means of a device as shown in FIGS. 2 and 3.

The gel ink 2 was charged in an apparatus as shown in FIG. 2 wherein an ink-carrying roller 1 comprising a cylindrical roller of 40 mm in diameter having a surface of stainless steel with a surface roughness of 100S and an intermediate transfer roller 6 comprising an iron cylindrical roller of 40 mm in diameter having a surface coated with a hard chromium plating were disposed opposite to each other with a gap of 1 mm at the ink transfer position.

Further, the ink-carrying roller 1 and a coating roller 4 of 40 mm in diameter were disposed opposite to each other with a gap of 1 mm. The gel ink 2 obtained above was charged in the ink reservoir 3.

The ink-carrying roller 1 was rotated in the arrow D direction at about 10 rpm and the coating roller 4 was rotated at about 12 rpm to form a layer of the ink 2, whereby the ink 2 of the present invention could be suitably applied onto the ink-carrying roller 1 to form an ink layer having a very smooth surface. Thus, a uniform coating could be effected.

In contact with the thus formed ink layer 2, the intermediate transfer roller 6 was rotated in the arrow E direction at about 10 rpm. In this instance, when electric energy was not supplied from a recording head 5 to the ink layer 2, a very slight amount of water was transferred to the transfer roller 6, but the ink 2 was not substantially transferred to the transfer roller 6. The recording head 5 had a structure as shown in FIG. 4, wherein each electrode element **5*b* of a plating of Pt was coated with a polyimide insulating film 5*c*** except for a tip thereof which had an area of 1 mm×1 mm.

On the other hand, when a pulse of 15 V and 25 msec was applied through the ink layer 2 between the recording head 5 as the anode and the ink-carrying roller 1 as the cathode, the ink 2 was selectively transferred to the transfer roller 6 to form an ink pattern **2*b*** thereon.

At the ink image transfer position, a platen roller 7 of a 20 mm-dia. iron cylindrical roller surfaced with 10 mm-thick silicone rubber layer was disposed opposite to the intermediate transfer roller 6 with a recording medium 8 of plain paper disposed therebetween moving in the arrow G direction. Further, the platen roller 7 was rotated in the arrow F direction at the same speed as the transfer roller 60 while exerting a slight pressure onto the recording medium 8. As a result, cyan-colored dot images **2*c* each of about 1 mm×1 mm in size corresponding to the ink pattern 2*b* were formed on the recording medium 8**.

The transferred image **2*c* formed on the recording paper 8** was a high-quality image without trailing and fog, and with a high image density.

The printed portion of the recording paper 8 formed in the above-mentioned recording due to electric conduction had a width of 50 mm wherein the area rate of the actually printed images was 50%. Such recording was effected repeatedly and the change in image density and resolution was evaluated. As a result, there were obtained good images having substantially no variation in image density and resolution compared with the initial image, even when 300 sheets of cut plain paper having a size of 297 mm×52.5 mm (corresponding to ¼ of A-4 size) were printed in the longitudinal direction thereof.

EXAMPLE 7

An ink was prepared in the same manner as in Example 6 except that silica-magnesia (Nikkagel M-30, mfd. by Nihon Kassei Hakudo K.K.) was used instead of the silica-alumina used in Example 6.

By using the thus prepared ink, experiments inclusive of image recording were conducted in the same manner as in Example 6. As a result, images having a good image quality were obtained similarly as in Example 6, even after 300 sheets of cut paper were printed.

EXAMPLE 8

An ink was prepared in the same manner as in Example 6 except that silica-alumina (trade name: N633L, $Al_2O_3$ content of 13 wt. % mfd. by Nikki Kagaku K.K.) was used instead of the silica-alumina (trade name: N633 HN, $Al_2O_3$ content of 28 wt. %, mfd. by Nikki Kagaku K.K.) used in Example 6.

By using the thus prepared ink, experiments inclusive of image recording were conducted in the same manner as in Example 6. As a result, images having a good image quality were obtained similarly as in Example 6, even after 300 sheets of the cut paper were printed.

EXAMPLE 9

An ink was prepared in the same manner as in Example 6 except that silica-magnesia (trade name: E53J1, mfd. by Nikki Kagaku K.K.) was used instead of the solid acid of silica-alumina used in Example 6.

By using the thus prepared ink, experiments inclusive of image recording were conducted in the same manner as in Example 6. As a result, images having a good image quality were obtained similarly as in Example 6, even after 300 sheets of the cut paper were printed.

COMPARATIVE EXAMPLE 3

An ink was prepared in the same manner as in Example 6 except that the silica-alumina was not used.

By using the thus prepared ink, an image recording was conducted in the same manner as in Example 6. As a result, only images having a low image density and a poor image quality as compared with the initial image were obtained after 300 sheets of the cut paper were printed. Further, the image quality of the thus obtained image was lower than that in Example 6.

What is claimed is:

1. A nonadhesive image recording ink, comprising: a dispersion medium which is liquid at room temperature; substance which is a reversible crosslinked structure selected from the group consisting of irregularly crosslinked, or a network, honeycomb or helix and impregnated with the dispersion medium; and a pH buffering electrolyte, wherein said ink is imparted with adhesiveness upon application of electric current and has a ratio (G″/G′) of loss elasticity modulus (G″) to storage elasticity modulus (G′) of from 0.1–10, and said crosslinked structure is at least partially reversibly converted into a sol. state upon application of electric current.

2. An ink according to claim 1, wherein said electrolyte comprises at least one selected from the group consisting of a weak acid, a weak acid salt, a weak base, and a weak base salt.

3. An ink according to claim 1, wherein said electrolyte comprises a metal having a small ionization tendency.

4. An ink according to claim 1, wherein said electrolyte is contained in an amount of 0.5–20 parts with respect to 100 parts of the liquid dispersion medium.

5. A nonadhesive image recording ink, comprising: a dispersion medium which is liquid at room temperature; a substance which is a reversible crosslinked structure selected from the group consisting of irregularly crosslinked, or a network, honeycomb or helix and impregnated with the dispersion medium; and an ionic surfactant, wherein the ink is imparted with adhesiveness upon application of electric current and has a ratio (G″/G′) of loss elasticity modulus (G″) to storage elasticity modulus (G′) of from 0.1–10, and said crosslinked structure is at least partially reversibly converted into a sol. state up application of electric current.

6. An ink according to claim 5, wherein said ionic surfactant comprises an anionic surfactant.

7. An ink according to claim 5, wherein said ionic surfactant comprises a cationic surfactant.

8. An ink according to claim 5, wherein said ionic surfactant comprises an ampholytic surfactant.

9. An ink according to claim 5, which contains 0.01–50 wt. % thereof of said ionic surfactant.

10. An ink according to claim 9, which contains 0.1–20 wt. % thereof of said ionic surfactant.

11. A nonadhesive image recording ink, comprising: a dispersion medium which is liquid at room temperature a substance which is reversibly crosslinked structure selected from the group consisting of irregularly crosslinked, or a network, honeycomb or helix and impregnated with the dispersion medium; and a solid metal oxide acid, wherein the ink is imparted with adhesiveness upon application of electric current and has a ratio (G''/G') of loss elasticity modulus (G'') to storage elasticity modulus (G') of from 0.1-10, and said crosslinked structure is a least partially reversibly converted into a sol. state upon application of electric current.

12. An ink according to claim 11, wherein said solid acid comprises one species of metal ion.

13. An ink according to claim 11, wherein said solid acid comprises two species of metal ions.

14. An ink according to claim 11, which contains 0.1-20 wt. % thereof of said solid acid.

15. An ink according to claim 14, which contains 0.6-10 wt. % thereof of said solid acid.

* * * * *

UNITED STATES PATENT AND TRADEMARK OFFICE

CERTIFICATE OF CORRECTION

PATENT NO. : 4,838,940

DATED : June 13, 1989

INVENTOR(S) : FUMITAKA KAN, ET AL.

It is certified that error appears in the above-identified patent and that said Letters Patent is hereby corrected as shown below:

COLUMN 28

Line 22, "substance" should read --a substance--.
Line 53, "up" should read --upon--.
Line 65, "temperature" should read --temperature;--.
Line 66, "is reversibly" should read --is a reversibly--.

Signed and Sealed this

Twelfth Day of June, 1990

Attest:

HARRY F. MANBECK, JR.

*Attesting Officer*

*Commissioner of Patents and Trademarks*